(12) United States Patent
Suthar et al.

(10) Patent No.: US 9,650,525 B1
(45) Date of Patent: May 16, 2017

(54) AQUEOUS INK FOR INK-JET HEADS

(71) Applicant: Funai Electric Co., LTD., Daito, Osaka (JP)

(72) Inventors: Ajay K. Suthar, Lexington, KY (US); Sam Norasak, Lexington, KY (US)

(73) Assignee: FUNAI ELECTRIC CO., LTD. (JP)

( * ) Notice: Subject to any disclaimer, the term of this patent is extended or adjusted under 35 U.S.C. 154(b) by 0 days.

(21) Appl. No.: 15/232,059

(22) Filed: Aug. 9, 2016

(51) Int. Cl.
  *G01D 11/00* (2006.01)
  *C09D 11/107* (2014.01)
  *C09D 11/322* (2014.01)
  *C09D 11/023* (2014.01)
  *B41J 2/14* (2006.01)

(52) U.S. Cl.
  CPC .......... *C09D 11/107* (2013.01); *B41J 2/14016* (2013.01); *C09D 11/023* (2013.01); *C09D 11/322* (2013.01)

(58) Field of Classification Search
  CPC .... B41J 2/14016; B41J 2/2107; B41J 11/002; B41J 11/015; B41J 11/2114; G09D 11/107; G09D 11/322; G09D 11/024
  See application file for complete search history.

(56) References Cited

U.S. PATENT DOCUMENTS

| 5,510,452 A | 4/1996 | Santhanam |
| 6,010,564 A * | 1/2000 | Zhu ................... C09D 11/36 106/31.37 |
| 6,770,688 B1 | 8/2004 | Miyamoto |
| 8,697,774 B2 | 4/2014 | Tomura et al. |
| 2013/0088542 A1 | 4/2013 | Hisanaga |

FOREIGN PATENT DOCUMENTS

GB  0870994 A1  6/1961

* cited by examiner

*Primary Examiner* — Juanita D Jackson
(74) *Attorney, Agent, or Firm* — Luedeka Neely Group, PC

(57) ABSTRACT

An ink composition, a printer and a method for ejecting and aqueous fluid having a viscosity above about 1 Pa-sec at 25° C. from a fluid ejection head. The ink composition, printer and method include an aqueous fluid that contains an aqueous carrier component, solid particles ranging from about 8 wt. % to about 25 wt. % based on a total weight of the aqueous fluid, and a rheology modifier. A heater pulse signal applied to ejection heaters on a fluid ejection head for a period of time is sufficient to sputter fluid from fluid ejection nozzles associated with the ejection heaters and to shear the fluid thereby reducing the viscosity of the fluid from above about 1 Pa-sec to less than about 0.1 Pa-sec. A firing signal subsequently applied to the ejection heaters on the ejection head provides steady state fluid ejection from the ejection head.

18 Claims, 5 Drawing Sheets

AQUEOUS INK FOR INK-JET HEADS

TECHNICAL FIELD

The disclosure is directed to methods for reliably jetting fluids onto a substrate, into the atmosphere or into a gas, into a liquid, or onto a solid material and in particular to methods for improving the reliability of jetting fluidic quantities of fluids using fluid thermal jet heads.

BACKGROUND AND SUMMARY

Ink-jet technology using aqueous inks is very well understood when jetting fluids of that exhibit Newtonian fluid dynamic behavior. However, high solids containing fluid formulations are particularly troublesome during an initial fluid jetting startup after a period of non-ejection of fluid. For example, ink-jet inks may contain high density particles such as colorant and/or pigments which may settle from the bulk fluid quickly in the fluid ejection heads. Settling of such high density particles causes a concentration gradient which significantly increases the fluid density and viscosity in the microscopic flow features of a fluid ejection head.

Accordingly, such fluids will often fail to eject from fluid jet heads when the jet head ejection nozzles or jet heads are idle for a period of time, thus resulting in poor startup of fluid ejection, poor fluid jetting, and in the case of colorants and/or pigments, poor color consistency. While the bulk fluid may be stirred or agitated to increase the dispersion of particles in the fluid, such stirring or agitation is not effective for the flow feature areas and nozzles in the ejection head. Accordingly, the initial ejection of high solids containing fluids from an ejection head is a challenge.

By "high solids" is meant fluid formulations that contain from about 8 wt. % to about 25 wt. % solid particles. Such fluids may be used in ink formulations for cosmetic ink applications, for example, and thus may have a relatively high non-volatile particle settling rate over time and a viscosity of above about 1 Pa-sec at 25° C.

Embodiments of the disclosure provide an ink composition, a printer and a method for ejecting and aqueous fluid having a viscosity above about 1 Pa-sec at 25° C. from a fluid ejection head. The ink composition, printer and method include an aqueous fluid that contains an aqueous carrier component, solid particles ranging from about 8 wt. % to about 25 wt. % based on a total weight of the aqueous fluid, and a rheology modifier. A heater pulse signal applied to ejection heaters on a fluid ejection head for a period of time is sufficient to sputter fluid from fluid ejection nozzles associated with the ejection heaters and to shear the fluid thereby reducing the viscosity of the fluid from above about 1 Pa-sec to less than about 0.1 Pa-sec at 25° C. A firing signal subsequently applied to the ejection heaters on the ejection head provides steady state fluid ejection from the ejection head.

In one embodiment, there is provided an ink composition that includes water, pigment particles, and a rheology modifier. The ink composition has a pigment content ranging from about 8 wt. % to about 25 wt. % based on a total weight of the ink composition. The rheology modifier is an alkali swellable acrylic polymer emulsion having a solids content of about 30 wt. % and a pH below about 4 and the rheology modifier is effective to provide a pseudo-plastic aqueous ink formulation.

A further embodiment provides a printer that contains an aqueous ink composition having a viscosity of greater than about 1 Pa-sec at 25° C. The aqueous ink composition includes, an aqueous carrier component, solid color particles ranging from about 8 wt. % to about 25 wt. % based on a total weight of the aqueous ink composition, and a rheology modifier. A heater pulse signal applied to ejection heaters on an ejection head of the printer for a period of time is sufficient to sputter ink from ejection nozzles associated with the ejection heaters and to shear the aqueous ink composition thereby reducing the viscosity of the ink composition from above about 1 Pa-sec to less than about 0.1 Pa-sec at 25° C. A firing signal applied to the ejection heaters on the ejection head provides steady state ejection of the aqueous ink composition from the ejection head.

In some embodiments, the rheology modifier is an alkali swellable acrylic polymer emulsion having a solids content of about 30 wt. % and a pH below about 4. In other embodiments, the aqueous fluid or ink contains from about 0.2 to about 1.0 percent by weight of the rheology modifier based on a total weight of the aqueous fluid or ink. In some embodiments, the rheology modifier provides a pseudo-plastic ink-jet ink formulation that, upon shearing, has a reduction in viscosity from about 1 Pa-sec to less than about 0.1 Pa-sec at 25° C. Such fluids may be hereinafter referred to as "thixotropic" fluids. Such fluids may be characterized by a thixotropic index. The thixotropic index represents the degree of thixotropy and is determined by taking a ratio of static viscosity of the fluid to dynamic viscosity of the fluid.

In some embodiments, the heater pulse signal is at a frequency ranging from about 2 to about 5 KHz for a period of three to five seconds. In other embodiments, the heater pulse signal has a pre-heat pulse of about 200 to about 400 nanoseconds (nsec), a dead time of about 1200 nsec and a firing pulse ranging from about 900 to about 1000 nsec.

In some embodiments, the heater pulse signal is effective to provide a shear rate of the aqueous fluid or ink within flow features of the ejection head ranging from about 2 to about $3 \times 10^6$ per second.

In other embodiments, fluid or ink ejection is initiated in the absence of a pre-heat pulse used to lower the viscosity of the fluid or ink.

The foregoing methods are particularly suitable for the initial ejection of fluids having a high solids content when the ejection head has been idle or unused for a period of time. Such fluids typically contain thickeners or emulsifiers that tend to keep the solids in suspension. However, such thickeners or emulsifiers tend to greatly increase the viscosity of the fluids while keeping the particles in suspension in the fluids. Accordingly, it is difficult to refill the ejection heads after long idle times due to the size of flow features in the ejection head and the high viscosity of such fluids. The foregoing embodiments enable start up and continued operation of ejection heads ejecting such fluids without the need for a preheat pulse or step that may be harmful to the fluids and may accelerate drying of the fluid in or on the nozzles causing plugged nozzles.

BRIEF DESCRIPTION OF THE DRAWINGS

Further advantages of the embodiments will become apparent by reference to the detailed description of exemplary embodiments when considered in conjunction with the drawings, wherein like reference characters designate like or similar elements throughout the several drawings as follows.

DETAILED DESCRIPTION OF EXEMPLARY EMBODIMENTS

Figure 1:
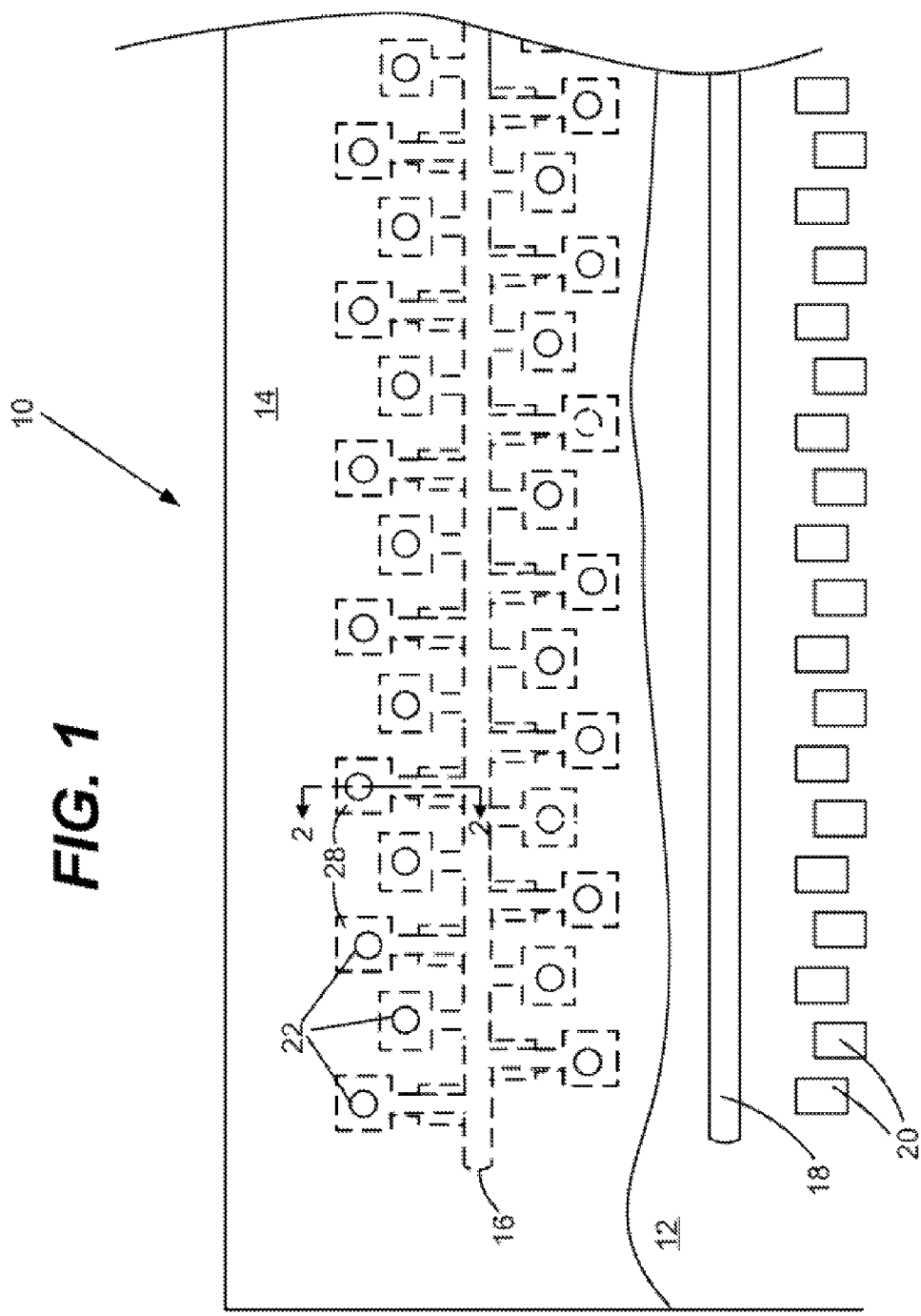
FIG. 1 is a plan schematic view, not to scale, of a portion of a thermal fluid ejection head.

A plan schematic view of a portion of a thermal fluid ejection head 10 is illustrated in FIG. 1. The ejection head 10 includes a silicon substrate 12 and a nozzle plate 14 attached to the substrate 12. The substrate 12 may include a single fluid feed slot or multiple fluid feed slots 16 and 18. A plurality of ejection devices, such as resistor heaters 20 are adjacent the slots 16 and 18. Upon activation of the ejection devices 20, fluids are ejected through nozzle holes 22 in the nozzle plate 14.

Figure 2:
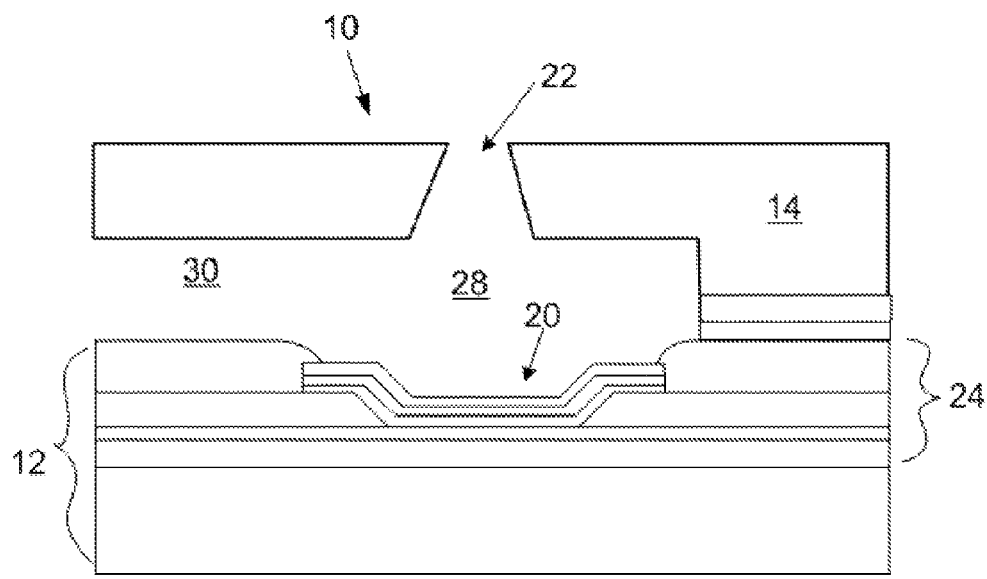
FIG. 2 is a cross-sectional view, not to scale, of a portion of the fluid ejection head of FIG. 1.

A cross-sectional view, not to scale, of a portion of the thermal fluid ejection head 10 is illustrated in FIG. 2. The silicon substrate 12 includes a plurality of layers 24 on the device side thereof defining the plurality of heater resistors 20. The nozzle plate 14 includes nozzle holes 22, a fluid chamber 28 and a fluid channel 30, collectively referred to as flow features, in fluid flow communication with the slot 16 for providing fluid to the heater resistor 20.

Figure 3:
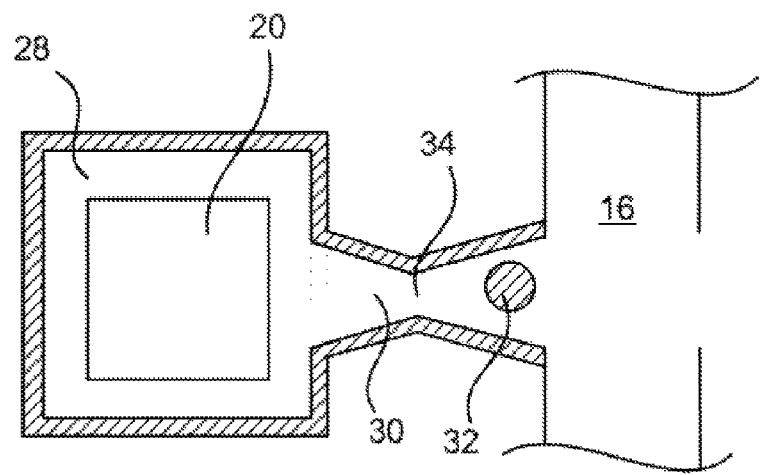
FIG. 3 is a plan view, not to scale, of a flow features and a fluid chamber for a fluid ejection head.

A plan view, not to scale of the flow feature of a single heater resistor 20 and fluid chamber 28 is illustrated in FIG. 3. The fluid channel 30 providing fluid from the fluid feed slot 16 may include a column 32 and/or other pinch points 34 that may inhibit or reduce the flow of fluid to the fluid chamber 28. Accordingly, for fluids that contain a high solids content, plugs of fluid may accumulate adjacent the columns 32 and/or pinch points 34 in the fluid channel 30, in the fluid chambers 28, and/or nozzles 22 preventing fluid from flowing into the fluid chamber 28 and being ejected through the nozzles 22.

Figure 4:
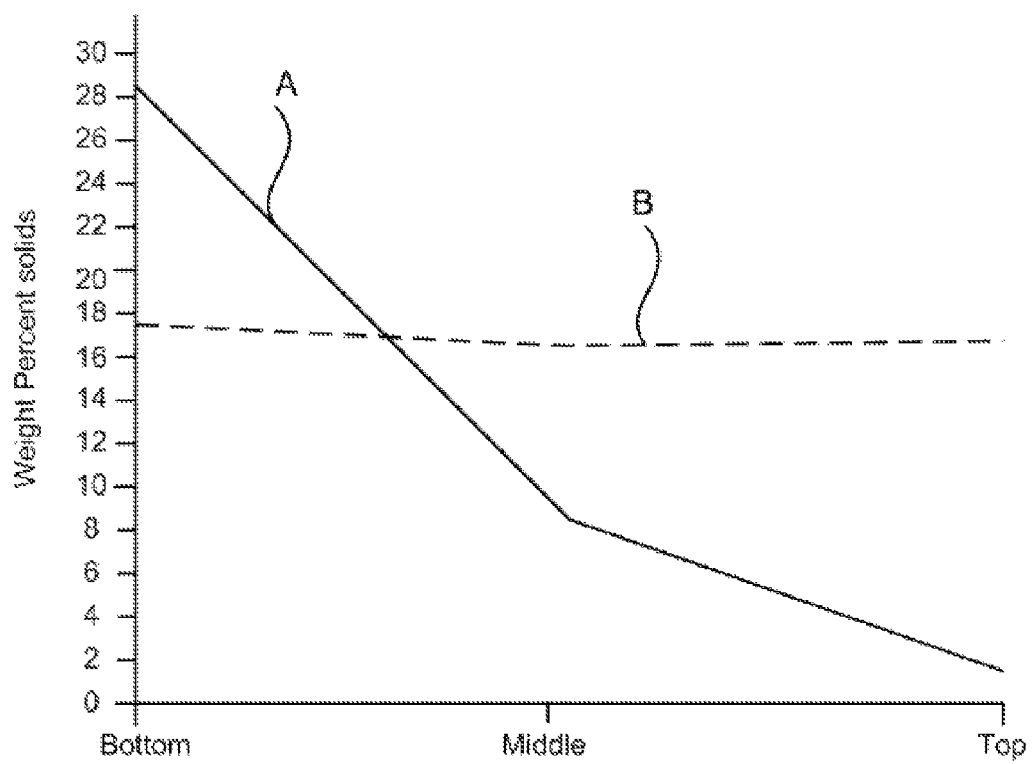
FIG. 4 is a graph showing solids content variation from bottom to top of jars containing conventional high solids fluids and fluids containing a rheology modifier according to the disclosure after 10 days.

As shown in FIG. 4, a fluid having a solids content of 20 wt. % was compared to the same fluid containing a rheology modifier according to the disclosure. After 10 days, the solids concentration at the bottom, middle and top of a jar containing the fluids was determined. FIG. 4 shows the results of the variation in solids content for a control fluid A (solid line) without the rheology modifier and a fluid B (dashed line) containing the rheology modifier. As shown by FIG. 4, fluid A had significant variation in solids content from top to bottom indicating that significant solids settling took place over the 10 day period. By contrast, fluid B had a relatively constant concentration of solids from top to bottom over the 10 day period. The rheology modifier that may be used to improve the suspension of solids in the fluid may be selected from a wide variety of rheology modifier or thickeners used for aqueous fluids including, but not limited to casein, alginates, modified cellulosic materials, acrylic polymers, maleic anhydride copolymers, polyamide resins, alkoxylated aliphatic amine diols, and alkali swellable acrylic polymer emulsions. A particularly suitable rheology modifier is the alkali swellable acrylic polymer emulsion sold under the tradename ACRYSOL EXCEL.

Since the flow features of a fluid ejection head 10 are in the micron range, solids settling over a period of time creates significant blockage in the ejection head 10. Blockage of flow feature in the ejection head 10 reduces the fluid refill time for the fluid chambers 28 and thus reduces the ejection head frequency. A typical fluid ejection head 10 operates with a frequency of about 25 to 50 kilohertz or higher. However, pluggage of the flow features of the ejection head 10 may reduce the frequency to below acceptable limits.

A high solids fluid also has a higher viscosity than a conventional aqueous fluid due to the presence of the rheology modifier used to keep the solids in suspension. Accordingly, the viscosity of the high solids fluid may be more than 1 Pa-sec at 25° C. The higher viscosity of the fluid also reduces the flow rate of fluid through the flow features of the ejection head 10 thereby reducing ejection frequency and ejection head performance. Longer refill times for fluid to the ejection head 10 may result in misfiring from a nozzle, reduced fluid droplet volumes, low fluid ejection velocity, fluid droplet misdirection, and the like. The amount of a typical fluid droplet for an ink formulation may range from about 2000 picograms for color inks to about 16,000 picograms for black inks. Corresponding fluid droplet diameters may range from about 14 µm to about 29 µm. Other fluids may have droplet amounts above or below the foregoing amounts depending on the viscosity of the fluid.

Figure 5:
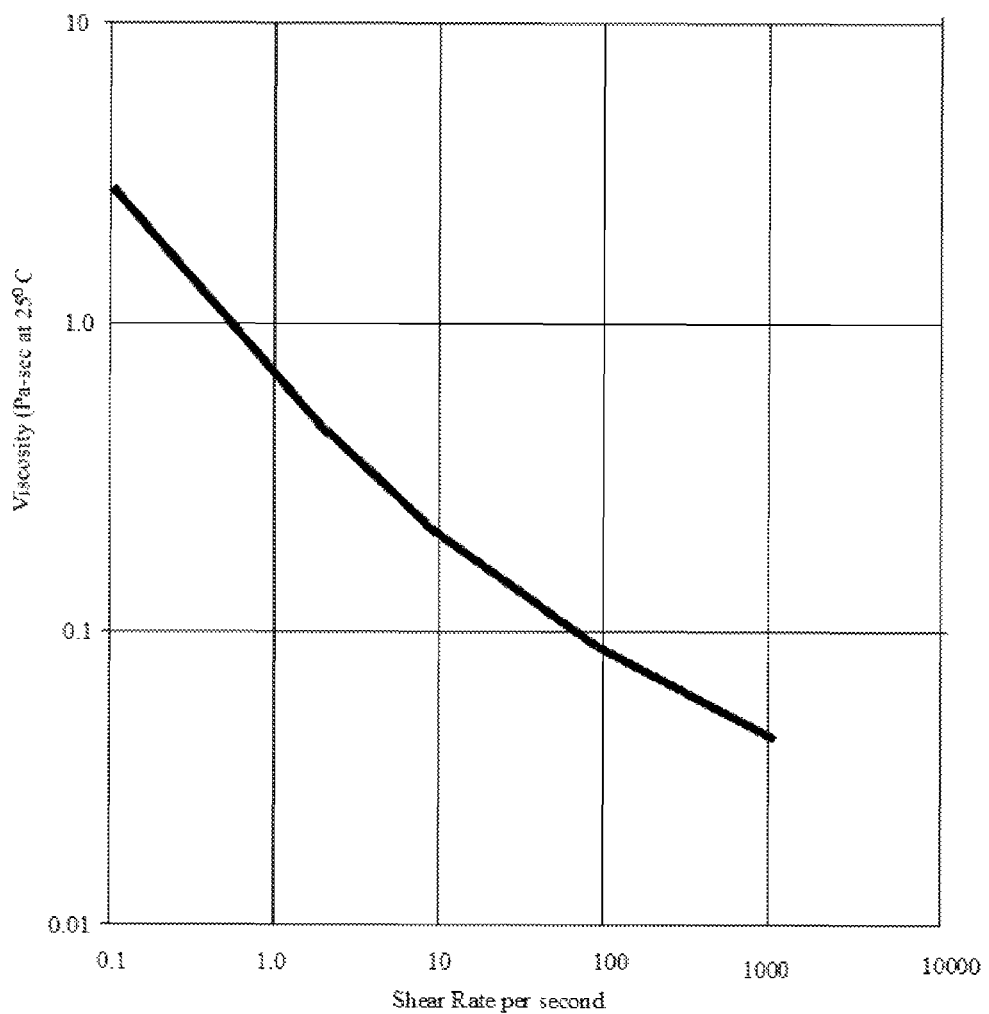
FIG. 5 is a graphical estimate of a change in viscosity with shear rate for a fluid composition according to the disclosure.

Use of from 0.2 to 1.0 percent by weight such as from 0.2 to 0.6 percent by weight of the alkali swellable acrylic polymer emulsion in the aqueous fluids of the disclosure provide a composition having a thixotropic index of from about 1 to about 50 such as from about 5 to about 20. The thixotropic index of the fluid may be estimated from the graph in FIG. 5 showing the viscosity at 25° C. of the fluid at shear rates ranging from $10^{-1}$ per second to $10^3$ per second.

Figure 6:
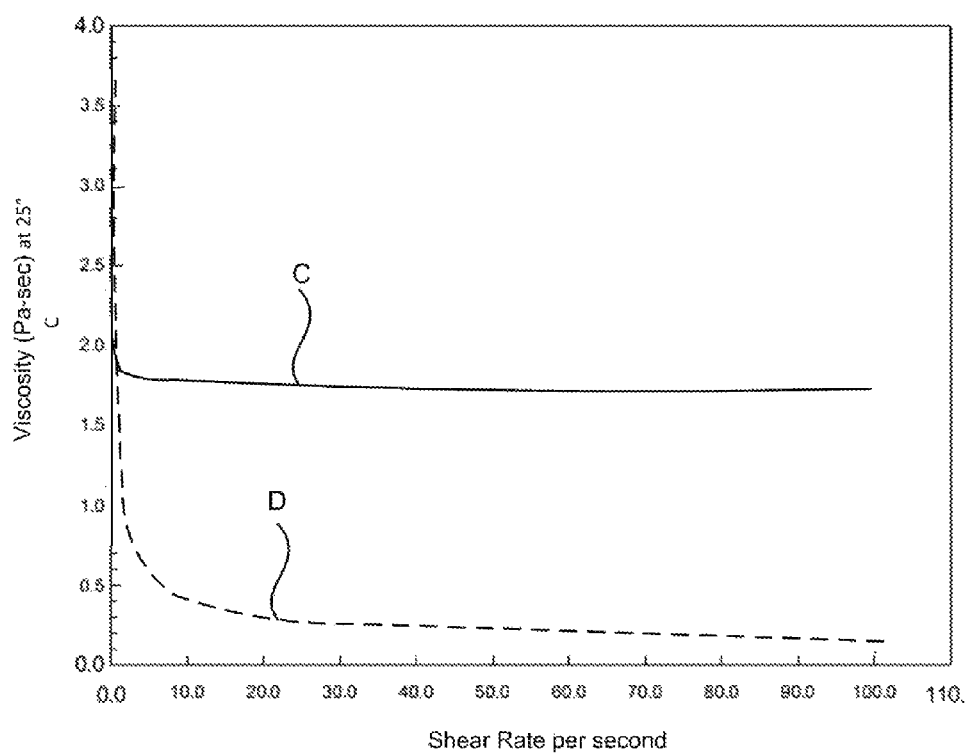
FIG. 6 is a graphical representation of a change in viscosity with shear rate for a control fluid and for a fluid according to the disclosure.

The viscosity characteristics of a silicone oil standard fluid is shown as line C in FIG. 6. Such a fluid has very little change in viscosity with shear rate. However, a fluid composition containing the rheology modifier according to the disclosure has a significant change in viscosity with shear rate as evidenced by line D in FIG. 6.

In view of the foregoing viscosity characteristics of a rheology modified fluid according to the disclosure, a procedure was developed to initiate flow of fluid in the flow features of a fluid ejection head 10 after particle settling in the flow features has occurred. According to the procedure, a heater pulse signal at a frequency ranging from about 2 to about 5 KHz is applied to the heater resistors 20 for a period of three to five seconds. This pulse signal has a pre-heat pulse of about 200 to about 400 nanoseconds (nsec), a dead time of about 1200 nsec and a firing pulse ranging from about 900 to about 1000 nsec. Since the rheology modified fluid is sensitive to shear as shown in FIG. 6, the bursts of energy provided by the heater pulse signal is effective to shear the fluid and thus cause a significant decrease in fluid viscosity. Accordingly, a shear rate for the aqueous fluid within flow features of the ejection head 10 ranges from about 2 to about $3 \times 10^6$ per second in order to decrease the viscosity of the fluid. The foregoing heater pulse signal causes fluid to sputter from the nozzles 22. Nozzle sputtering loosens up any viscous plugging material that may be in the flow feature areas of the ejection head 10 thereby starting flow of fluid through the flow features of the ejection head 10. Once the plugging fluid has been loosed up by the foregoing procedure, continuous ejection of fluid from the ejection head may be obtained using a pulse train that includes a pre-fire pulse of 200 to 300 nsec, a dead time of 1200 nsec and a jetting pulse of 700 to 950 nsec.

The foregoing procedure is thus able to obtain thixotropic behavior for a stabilized fluid composition containing a high solids content so that the fluid exhibits pseudo plastic characteristics upon shearing. Since significant heating of the fluid is avoided by the foregoing procedure, deterioration of the fluid is avoided as well as drying of the fluids in the nozzles 22.

It is contemplated, and will be apparent to those skilled in the art from the preceding description and the accompanying drawings, that modifications and changes may be made in the embodiments of the disclosure. Accordingly, it is expressly intended that the foregoing description and the accompanying drawings are illustrative of exemplary embodiments only, not limiting thereto, and that the true spirit and scope of the present disclosure be determined by reference to the appended claims.

What is claimed is:

1. An ink composition comprising:
    water;
    pigment particles, wherein the ink composition has a pigment content ranging from about 8 wt. % to about 25 wt. % based on a total weight of the ink composition; and
    a rheology modifier, wherein the rheology modifier is an alkali swellable acrylic polymer emulsion having a solids content of about 30 wt. % and a pH below about 4 and the rheology modifier is effective to provide a pseudo-plastic aqueous ink formulation.

2. The ink composition of claim 1, wherein the pseudo-plastic ink-jet ink formulation has a viscosity at 25° C. that is reduced from about 1 Pa-sec to less than about 0.1 Pa-sec upon shearing the pseudo-plastic ink formulation.

3. The ink composition of claim 1, wherein the amount of rheology modifier in the ink composition may range from about 0.2 wt. % to about 0.6 wt. % based on a total weight of the ink formulation.

4. A printer comprising
    an aqueous ink composition having a viscosity of greater than about 1 Pa-sec at 25° C., the aqueous ink composition comprising, an aqueous carrier component, solid color particles ranging from about 8 wt. % to about 25 wt. % based on a total weight of the aqueous ink composition, and a rheology modifier;
    wherein a heater pulse signal applied to ejection heaters on an ejection head of the printer for a period of time is sufficient to sputter ink from ejection nozzles associated with the ejection heaters and to shear the aqueous ink composition thereby reducing the viscosity of the ink composition from above about 1 Pa-sec to less than about 0.1 Pa-sec at 25° C.; and wherein a firing signal applied to the ejection heaters on the ejection head provides steady state ejection of the aqueous ink composition from the ejection head.

5. The printer of claim 4, wherein the rheology modifier comprises an alkali swellable acrylic polymer emulsion having a solids content of about 30 wt. % and a pH below about 4.

6. The printer of claim 4, wherein the aqueous ink composition contains from about 0.2 to about 0.6 percent by weight of rheology modifier based on a total weight of the aqueous ink composition.

7. The printer of claim 4, wherein the heater pulse signal is at a frequency ranging from about 2 to about 5 KHz for a period of three to five seconds.

8. The printer of claim 4, wherein the heater pulse signal has a pre-heat pulse of about 200 to about 400 nanoseconds (nsec), a dead time of about 1200 nsec and a firing pulse ranging from about 900 to about 1000 nsec.

9. The printer of claim 4, wherein a shear rate of the aqueous ink composition within flow features of the ejection head ranges from about 2 to about $3 \times 10^6$ per second.

10. The printer of claim 4, wherein ink ejection is initiated in the absence of a pre-heat pulse used to lower the viscosity of the aqueous ink composition.

11. A method for ejecting and aqueous fluid having a viscosity above about 1 Pa-sec at 25° C. from a fluid ejection head, the method comprising the steps of:
    providing an aqueous fluid comprising, an aqueous carrier component, solid particles ranging from about 8 wt. % to about 25 wt. % based on a total weight of the aqueous fluid, and a rheology modifier;
    applying a heater pulse signal to ejection heaters on a fluid ejection head for a period of time sufficient to sputter fluid from fluid ejection nozzles associated with the ejection heaters and to shear the fluid thereby reducing the viscosity of the fluid from above about 1 Pa-sec to less than about 0.1 Pa-sec at 25° C.; and
    subsequently, applying a firing signal to the ejection heaters on the ejection head during which steady state fluid ejection from the ejection head occurs.

12. The method of claim 11, wherein the rheology modifier comprises an alkali swellable acrylic polymer emulsion having a solids content of about 30 wt. % and a pH below about 4.

13. The method of claim 11, wherein the aqueous fluid contains from about 0.2 to about 0.6 percent by weight of rheology modifier based on a total weight of the aqueous fluid.

14. The method of claim 11, wherein the heater pulse signal is at a frequency ranging from about 2 to about 5 KHz for a period of three to five seconds.

15. The method of claim 14, wherein the heater pulse signal has a pre-heat pulse of about 200 to about 400 nanoseconds (nsec), a dead time of about 1200 nsec and a firing pulse ranging from about 900 to about 1000 nsec.

16. The method of claim 11, wherein a shear rate of the aqueous fluid within flow features of the ejection head ranges from about 2 to about $3 \times 10^6$ per second.

17. The method of claim 11, wherein fluid ejection of the aqueous fluid is initiated in the absence of a pre-heat pulse used to lower the viscosity of the fluid.

18. The method of claim 11, wherein the aqueous fluid is a pigmented ink composition.

* * * * *

UNITED STATES PATENT AND TRADEMARK OFFICE
CERTIFICATE OF CORRECTION

| | | |
|---|---|---|
| PATENT NO. | : 9,650,525 B1 | Page 1 of 1 |
| APPLICATION NO. | : 15/232059 | |
| DATED | : May 16, 2017 | |
| INVENTOR(S) | : Suthar et al. | |

It is certified that error appears in the above-identified patent and that said Letters Patent is hereby corrected as shown below:

On the Title Page

At Item (72), Inventors:
At Line number 3, add the following names:
Janette Villalobos Lingoes, Cincinnati, OH (US);
Thomas E. Rabe, Baltimore, MD (US)

Signed and Sealed this
Fourteenth Day of May, 2019

Andrei Iancu
*Director of the United States Patent and Trademark Office*